United States Patent [19]

Shmidt et al.

[11] Patent Number: 5,780,521
[45] Date of Patent: Jul. 14, 1998

[54] EXTRUDED, OPEN-CELL MICROCELLULAR ALKENYL AROMATIC POLYMER FOAMS, PROCESS FOR MAKING, AND ARTICLES MADE THEREFROM

[75] Inventors: Creston D. Shmidt, Nashport; Daniel D. Imeopkaria, Pickerington; Kyung W. Suh; Bruce A. Malone, both of Granville; Ken Franklin, Gahanna, all of Ohio

[73] Assignee: The Dow Chemical Company, Midland, Mich.

[21] Appl. No.: 932,031

[22] Filed: Sep. 17, 1997

Related U.S. Application Data

[63] Continuation of Ser. No. 736,454, Oct. 24, 1996, abandoned, which is a continuation of Ser. No. 595,696, Feb. 2, 1996, abandoned, which is a continuation-in-part of Ser. No. 430,783, Apr. 27, 1995.

[51] Int. Cl.$^6$ .................................................... C08J 9/08
[52] U.S. Cl. .............................. 521/79; 264/50; 264/51; 264/53; 521/79; 521/81; 521/97; 521/139
[58] Field of Search .......................... 521/79, 81, 97, 521/139; 264/50, 51, 53

[56] References Cited

U.S. PATENT DOCUMENTS

| | | | |
|---|---|---|---|
| 3,753,932 | 8/1973 | Jenkins | 260/2.5 R |
| 4,041,115 | 8/1977 | Jenkins et al. | 264/5 |
| 4,473,665 | 9/1984 | Martini-Vvedensky et al. | 521/79 |
| 4,528,221 | 7/1985 | Komatsuzaki et al. | 521/139 |
| 4,673,695 | 6/1987 | Aubert et al. | 521/64 |
| 4,728,559 | 3/1988 | Hardenbrook et al. | 428/159 |
| 4,966,919 | 10/1990 | Williams, Jr. et al. | 521/54 |
| 5,037,859 | 8/1991 | Williams, Jr. et al. | 521/55 |
| 5,158,986 | 10/1992 | Cha et al. | 521/82 |
| 5,286,429 | 2/1994 | Blythe et al. | 521/79 |
| 5,334,356 | 8/1994 | Baldwin et al. | 422/133 |
| 5,346,928 | 9/1994 | DeVos et al. | 521/166 |
| 5,411,687 | 5/1995 | Imeokparia et al. | 521/79 |

FOREIGN PATENT DOCUMENTS

| | | | |
|---|---|---|---|
| 0090507 | 10/1983 | European Pat. Off. | B65D 81/26 |
| 53-124574 | 10/1978 | Japan | B29D 27/00 |
| 155724 | 6/1989 | Japan | B29C 47/00 |
| 02076715 A2 | 3/1990 | Japan | C08J 9/00 |

*Primary Examiner*—Morton Foelak
*Attorney, Agent, or Firm*—J. Robert Dean, Jr.

[57] ABSTRACT

Disclosed is an extruded, open-cell microcellular alkenyl aromatic polymer foam useful in insulating applications. The foam has an open cell content of about 70 percent or more. The foam has an average cell size of about 70 micrometers or less. The foam is particularly useful in evacuated or vacuum insulation panels. Further disclosed is a process for making the open-cell foam. Further disclosed is a fabricated foam article.

26 Claims, No Drawings

5,780,521

EXTRUDED, OPEN-CELL MICROCELLULAR ALKENYL AROMATIC POLYMER FOAMS, PROCESS FOR MAKING, AND ARTICLES MADE THEREFROM

CROSS-REFERENCE TO RELATED APPLICATION

This is a continuation of application Ser. No.08/736,454 filed Oct. 24, 1996 now abandoned, which is a continuation of U.S. Ser. No. 08/595,696, filed Feb. 2, 1996 now abandoned which is a continuation-in-part application of U.S. Ser. No. 08/430,783 filed Apr. 27, 1995.

BACKGROUND OF THE INVENTION

This invention relates to an extruded, open-cell microcellular alkenyl aromatic polymer foam and a process for making.

To significantly improve the performance of insulating systems, vacuum panel technology is currently being evaluated by industry. The absence of air or gas in the panels affords the possibility of substantial enhancement of insulating performance.

To further significantly improve the performance of insulating systems, microcellular foams (e.g., about 70 micrometers or less) are being evaluated by industry. The small cell size affords the possibility of substantial enhancement of insulating performance in many instances.

Extruded, closed-cell alkenyl aromatic polymer foams of medium cell size (e.g., 0.2 to 1.0 millimeter (mm)) have been employed in insulating systems for decades. They offer good insulating performance and excellent mechanical strength. However, the closed-cell structure makes them unsuitable for use in vacuum systems. Closed-cell foams cannot be evacuated of entrapped gas easily or without collapsing them.

A means to address the problem of inability to evacuate would be to employ an alkenyl aromatic polymer foam with very high open cell content. However, the only known microcellular, open-cell alkenyl aromatic polymer foams are those prepared by phase separation or with supercritical fluids as seen in U.S. Pat. Nos. 4,673,695; 4,473,665; 5,158,986; and 5,334,356. These foams are expensive to produce and have limited mechanical strength.

It would be desirable to have a strong, economical, microcellular, open-cell alkenyl aromatic polymer foam to employ in vacuum insulation systems. It would further be desirable to have such foams in a cell size range of about 70 micrometers or less.

SUMMARY OF THE INVENTION

According to the present invention, there is an extruded, open-cell microcellular alkenyl aromatic polymer foam. The foam comprises an alkenyl aromatic polymer material comprising greater than 50 percent by weight of alkenyl aromatic monomeric units. The foam has an open cell content of about 70 percent or more. The foam has an average cell size of about 70 micrometers or less. The foam is useful in insulating applications and particularly useful in vacuum insulation panels.

Further according to the present invention, there is a process for making an extruded, open-cell microcellular alkenyl aromatic polymer foam having an open cell content of about 70 percent or more and an average cell size of about 70 micrometers or less. The process comprises: a) heating an alkenyl aromatic polymer material to form a melt polymer material; b) incorporating into the melt polymer material an amount of a nucleating agent additive; c) incorporating into the melt polymer material at an elevated pressure to form a foamable gel a blowing agent of which about 70 mole percent or more is selected from the group consisting of 1,1-difluoroethane (HFC-152a), 1,1,1-trifloroethane (HFC-143a), 1,1,1,2-tetrafluoro-ethane (HFC-134a), chlorodifluoromethane (HCFC-22), carbon dioxide ($CO_2$), and difluoromethane (HFC-32), and mixtures of the foregoing based upon the total number of moles of blowing agent, the blowing agent being present at about 0.06 to about 0.17 gram-moles or less per kilogram of polymer material; d) cooling the foamable gel to a foaming temperature sufficient to form a foam having about 70 percent or more open cell content; and e) extruding the foamable gel through a die into a region of lower pressure to form the foam.

Further according to the present invention, there is an evacuated insulation panel comprising the open-cell foam described above in a hermetically-sealed receptacle. The evacuated insulation panel provides excellent insulation performance.

Further according to the present invention, there is a fabricated article formed by mechanical deformation of an extruded, open-cell microcellular alkenyl aromatic polymer foam. The fabricated article is formed from a foam comprises an alkenyl aromatic polymer of greater than 50 percent by weight of alkenyl aromatic monomeric units and has an average cell size of about 1 to about 70 micrometers (prior to deformation), an open cell content of about 70 percent or more, and a density of about 25 to about 100 $kg/m^3$ (prior to deformation).

DETAILED DESCRIPTION

Extruded alkenyl aromatic polymer foams of high open cell content (about 70 percent or more) and microcellular cell size (about 70 micrometers or less) are heretofore unknown in the art. Such extruded foams have been deemed difficult to produce because of insufficient degree of nucleation, foam collapse, poor skin quality, and excessive density.

The present process achieves sufficient nucleation and forms the present foam by employing each of the following: a nucleating agent additive; a blowing agent which has a relatively high intrinsic nucleation potential; an amount of a blowing agent small enough to allow formation of an open-cell structure; and a relatively high foaming temperature to allow formation of an open-cell structure.

It is desirable to achieve the necessary level of nucleation with minimum processing difficulties in the extrusion system and maintain desirable end product foam properties. Processing difficulties are typically minimized when as much as possible of the requisite nucleation potential is obtained from the blowing agent and the least possible from the nucleating agent additive while maintaining desirable end product foam properties. Nucleating agent additives, in excessive amounts, can substantially alter processing properties such as gel viscosity and die pressure and end product foam properties such as skin quality, compressive strength, cross-section, and density. Incorporation of the nucleating agent additive is nonetheless an essential component of the extrusion process because the necessary nucleation potential cannot be attained with the blowing agent alone.

The amount of a nucleating agent additive employed to prepare the present open-cell foam will vary according to the desired cell size, foaming temperature, composition of the blowing agent, and composition and activity of the nucleating agent additive itself. Cell size decreases and open cell content increases with increasing nucleating agent content. Useful nucleating agents additives include inorganic substances such as calcium carbonate, talc, clay, titanium oxide, silica, barium sulfate, calcium stearate, styrene/maleic anhydride copolymer, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The blowing agent must be capable of imparting a high degree of nucleation in conjunction with the nucleating agent additive to ensure formation of a foam with the desired cell size and open cell content. Suitable blowing agents will have a relatively high intrinsic nucleation potential at temperatures and pressures in which alkenyl aromatic polymers, such as polystyrene, are typically extrusion-foamed. Suitable blowing agents affording a high degree of nucleation include 1,1-difluoroethane (HFC-152a), 1,1,1-trifluoroethane (HFC-143a), 1,1,1,2-tetrafluoroethane (HFC-134a), chlorodifluoromethane (HCFC-22), carbon dioxide ($CO_2$), and difluoromethane (HFC-32). Preferred blowing agents are HFC-152a, HFC-134a, and carbon dioxide. The above blowing agents will comprise 50 mole percent or more and preferably 70 percent or more of the total number of moles of blowing agent.

Blowing agents useful as co-blowing agents with the above agents include inorganic agents and organic blowing agents. Suitable inorganic blowing agents include water, argon, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, pentafluoroethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons include methyl chloride, methylene chloride, ethyl chloride (EtCl), 1,1,1-trichloroethane, 1,1-dichloro-1-fluoroethane (HCFC-141b), 1-chloro-1,1-difluoroethane HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane.

Another important feature of the invention is the amount of blowing agent incorporated into the polymer melt material to make a foam-forming polymer gel. The amount employed is from about 0.06 to about 0.17 gram-moles per kilogram of polymer, preferably from about 0.08 to about 0.12 gram-moles per kilogram of polymer, and most preferably from 0.09–0.10 gram-moles per kilogram of polymer. The use of a relatively small amount of blowing agent allows formation of a foam with a high open cell content.

Another important feature of the present invention is foaming temperature. The foaming temperature must be high enough to prevent premature stabilization of the expanding foam cells until rupture of the foam cell walls is achieved. The foams of the present invention are susceptible to premature cooling because of their small cell size and high open cell content. The small cell size causes rapid initial expansion of the foam upon exiting the die resulting in the rapid cooling of the foam. The high open cell content creates an open physical structure for heat and blowing agent to escape resulting in additional rapid cooling. The present invention compensates for the rapid cooling of the foam by foaming at a temperature greater than that typically employed for foam with larger cell sizes and smaller open cell contents.

The foaming temperature must not however, be so high as to cause other processing or product problems. Because of the high open cell content of the foam, excessively high foaming temperatures can cause foam collapse due to rapid loss of blowing agent and reduced ability of cell struts to resist ambient pressure. Thus, the foaming temperature must be high enough to prevent premature cooling of the foam, yet low enough to prevent its collapse. Further, high foaming temperatures can reduce extrusion die pressures to unacceptably low levels and negatively impact skin quality. The most desirable foaming temperature will be the lowest foaming temperature at which the foam can be made and still maintain the open cell structure.

Desirable foaming temperatures will depend upon factors including the configuration of the extrusion system, nucleating agent additive composition and concentration, blowing agent composition and concentration, polymer material characteristics, and extrusion die design. Preferred foaming temperatures will vary from about 118° C. to about 160° C. Most preferred foaming temperatures will vary from about 125° C. to about 135°C.

The present foam is generally prepared by heating an alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. The nucleating agent additive may be blended in the polymer melt or dry blended with the polymer material prior to plasticizing or melting. The foamable gel is typically cooled to a lower temperature to optimize or attain desired physical characteristics of the foam. The gel may be cooled in the extruder or other mixing device or in separate coolers. The gel is then extruded or conveyed through a die of desired shape to a zone of reduced or lower pressure to form the foam. The zone of lower pressure is at a pressure lower than that in which the foamable gel is maintained prior to extrusion through the die. The lower pressure may be superatmospheric or subatmospheric (vacuum), but is preferably at an atmospheric level.

The present foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., greater than 95 percent) and most preferably entirely of polystyrene. Preferably, the alkenyl aromatic polymer foam is free of rubber content such as $C_{4-6}$ diene content and thermoset polymer content such as polyisocyanurate or polyurethane.

The present foam has the density of from about about 16 to about 250 kilograms per cubic meter ($kg/cm^3$) and most preferably from about 25 to about 100 $kg/cm^3$ according to ASTM D-1622-88.

The present foam has an average cell size of about 70 micrometers or less, preferably about 1 to about 30 micrometers, and more preferably about 1 to about 20 micrometers, and most preferably from about 1 micrometer to about 10 micrometers according to ASTM D3576-77. The cell size or pore size (diameter) for the microcellular foams is determined according to ASTM D3576-77 except that measurement is taken from an enlarged photograph obtained by scanning electron microscopy instead of measurement taken directly from the foam.

Additional teachings to microcellular foams are seen in copending application U.S. Ser. No. 08/430,785 filed Apr. 27, 1995, which is incorporated herein by reference.

The teachings of parent application U.S. Ser. No. 08/430,783, filed Apr. 27, 1995, are incorporated herein by reference.

The present foam may take any physical configuration known in the art such as sheet, plank, or rounds. The present foam is particularly suited to be formed into a plank, desirably one having a cross-sectional area of 30 square centimeters (cm) or more and a minor dimension in cross-section (thickness) of about ⅜ inch (0.95 cm) or more.

The present foam has an open cell content of 70 percent or more, preferably 90 percent or more, and most preferably 95 percent or more according to ASTM D2856-A.

The present foam may contain an infrared attenuating agent (IAA) to enhance its insulating performance. The IAA is composed of a different substance than the polymer substrate of the foam in which it is incorporated. The IAA may absorb or reflect infrared radiation or both. Useful IAA include particulate flakes of metals such as aluminum, silver, and gold and carbonaceous substances such as carbon black, activated carbon black and graphite. Useful carbon blacks include thermal black, furnace black, acetylene black, and channel black. Preferred IAA are thermal black and graphite. The IAA preferably comprises between about 1.0 and about 25 weight percent and preferably between about 4.0 and about 20 weight percent and most preferably about 4.0 to about 10 weight percent based upon the weight of the polymer material.

The use of certain IAA such as carbon black or graphite provides certain advantages and can actually enhance formation of the present foam. Carbon black and graphite provide additional nucleating action to make cell size smaller, cell walls thinner, and create weak points in the cell walls. Thinner and weaker cell walls promote easier rupturing of the cell walls, and, thus, higher open cell content. Carbon black and graphite also increase gel viscosity, which allows a lower foaming temperature to be employed. The lower foaming temperature improves foam skin quality. The use of an IAA provides an additional advantage of inducing a greater proportional reduction in total foam thermal conductivity in microcellular foams than in foams of larger average cell size, particularly those of cell size ranges 0.1 millimeter to 2.0 millimeters corresponding to conventional commercial closed-cell insulation foams.

The present foam is preferably substantially non-crosslinked, which means that the foam is substantially free of crosslinking. This is inclusive however, of the slight degree of crosslinking which may occur naturally without the use of crosslinking agents or radiation. Substantially non-crosslinked foams contain no more than 5 percent gel per ASTM D-2765-84, method A.

Various additives may be incorporated in the present foam such as inorganic fillers, pigments, antioxidants, acid scavengers, ultraviolet absorbers, flame retardants, processing aids, extrusion aids, and the like.

An evacuated foam is a foam having within its cells a partial vacuum or near total vacuum of subatmospheric absolute pressure. An evacuated foam has preferably an absolute pressure of about 10 torr or less, more preferably about 1 torr or less, and most preferably about 0.1 torr or less.

An unevacuated (non-evacuated) foam is a foam having within its cellular structure an atmospheric absolute pressure.

The present foam may be used to insulate a surface by applying to the surface an insulating panel fashioned from the present foam. Such panels are useful in any conventional insulating applications such as roofing, buildings, refrigerators, etc.

The present foam is particularly useful as board stock in a hermetically-sealed vacuum panel. The panel may be formed as follows: a) the foam is placed inside a receptacle or enclosure such as a bag; b) the interior of the receptacle or enclosure and the foam are evacuated to a partial or near total vacuum (subatmospheric absolute pressure); and c) the receptacle or enclosure is sealed as to be air tight or hermetically sealed. The evacuated or vacuum panel is preferably evacuated to about 10 torr or less, more preferably to about 1 torr or less, and most preferably to about 0.1 torr or less absolute pressure. The vacuum panel is useful in the insulating applications described above.

To further enhance insulation performance in the vacuum panel, the foam may be compressed in the thickness direction prior to insertion. Insulation value per unit thickness is enhanced. It is preferred to compress the foam to about 40 to 60 percent of original thickness.

To further enhance the long-term performance of the vacuum panel, the evacuated interior of the panel may be provided with a "getter" material. The getter material absorbs gases and/or vapors which seep or permeate into the vacuum panel over time. Conventional getter materials include metal and metal alloys of barium, aluminum, magnesium, calcium, iron, nickel, and vanadium. Teachings to suitable getter materials include but are not limited to those set forth in U.S. Pat. Nos. 5,191,980, 5,312,606, 5,312,607, and WO 93/25843, which are incorporated herein by reference.

Other types of useful getter materials include conventional desiccants, which are useful for adsorbing water vapor or moisture. Such materials are advantageously incorporated into the evacuated insulation panel in the form of a packet having a porous or permeable wrapper or receptacle containing the material therein. Useful materials include silica gel, activated alumina, aluminum-rich zeolites, calcium chloride, calcium oxide, and calcium sulfate. A preferred material is calcium oxide.

A useful evacuated panel employs as an enclosure formed of a laminate sheet of three or more layers. The outer layer comprises a scratch resistant material such as a polyester. The middle layer comprises a barrier material such as aluminum, polyvinyline chloride, and polyvinyl alcohol. The inner layer comprises a heat sealable material such as polyethylene or ethylene/acrylic acid copolymer.

Further surprisingly, certain of the present foams have been found useful in fabrication applications at atmospheric and non-evacuated pressures. The foams have about 1 to about 70 micrometer cell size prior to compression, about 25 to about 100 kg/m³ density prior to compression, and about 70 percent or more open cell content prior to compression. The foam is readily formable and compressible to a variety of configurations and shapes. The fabricated foam maintains the deformed or compressed configuration while exhibiting about 5 percent or less recovery on a thickness or volume basis after release of the compressing or deforming stress.

The present foam has superior formability and compressibility compared to prior art foams of larger average cell size. The smaller average cell size of the present foam provides cell walls of smaller average thickness, which result in a foam matrix which is more readily deformable yet not so small in cell wall thickness as to be brittle and collapsable.

The present foam is more formable and compressible than prior art closed-cell foams because the open-cell structure of the present foam affords faster cell gas transfer out of the foam during deformation. The faster cell gas transfer decreases resistance to deformation and minimizes foam recovery upon release of mechanical stress.

The present fabricable foam can deform upon application of mechanical stress without substantial fracture or collapse as observed in polyisocyanurate and rigid polyurethane foams and without exhibiting substantial resiliency or recovery upon release of mechanical stress as observed in polyolefin foams or flexible polyurethane foams. Alkenyl aromatic polymers in the present fabricable foams are superior to polyisocyanurate or rigid polyurethane polymers because they can deform to a substantial degree without fracture or collapse and are superior to polyolefins because they can deform without exhibiting substantial resiliency or recovery.

The following are examples of the present invention, and are not to be construed as limiting. Unless otherwise indicated, all percentages, parts, or proportions are by weight based upon polymer weight.

EXAMPLES

Extruded, open-cell, microcellular alkenyl aromatic polymer foams of the present invention were prepared as described below.

Example 1

Foams were prepared with two different extrusion systems, each comprising an extruder, a mixer, a cooler, and an extrusion die in series. The two systems operated at different extrusion rates, 10 pounds per hour (lb/hr) (4.5 kilograms/hour (kg/hr) and 220 lb/hr (100 kg/hr). They are referred to as the first and the second extrusion systems, respectively.

The foams of the first extrusion system were made with the following formulation: a blowing agent of 7.5 parts per hundred (pph) of HCFC-142b, 2.0 pph EtCl, and 1.4 pph $CO_2$); optionally carbon black (Raven 430 of Cabot Corp.); 0.5 pph talc; a minor amount of calcium stearate; and a polystyrene resin of 200,000 weight average molecular weight according to size exclusion chromatography (SEC).

The foams of the second extrusion system were made with the following formulation: a blowing agent of 6.8 pph HFC-134a, 1.9 pph HFC-152a, and 0.6 pph $CO_2$; carbon black (Thermal Black FT 239 of Huber Corp.); 0.4 pph talc; minor amount of calcium stearate; and polystyrene resin of 200,000 weight average molecular weight according to SEC.

Foams were made in both extrusion systems with various carbon black loadings and at various foaming temperatures. The R value for foams was measured at atmospheric pressure (760 torr) and in a vacuum (1 torr). R value was measured according to ASTM C-518-91 in an environmental pressure control system capable of maintaining its set point condition within ±0.01 torr wherein the control system is employed in conjunction with a heat flow meter apparatus.

Microcellular foams of small average cell size and high open cell content were produced. Cell size, open cell content, density, and R value are set forth in Table 1. For microcellular foams made in both extrusion systems, increasing the level of carbon black increased R value.

Example 2

Foams of the present invention were prepared with the second extrusion system except as indicated below and in Table 2.

The foams were prepared with various blowing agents and mixtures thereof as specified in Table 2. The blowing agent loadings were pph based upon polymer weight. The foams were made with various carbon black loadings and at various foaming temperatures.

The R value for foams was measured at various pressures by the method set forth in Example 1.

Microcellular foams of small average cell size, high open cell content, and high R value were produced.

Example 3

Foams of the present invention were prepared with the second extrusion system except as indicated below and in Table 3.

The foams were prepared with various blowing agents and mixtures thereof as specified in Table 3. The blowing agent loadings were pph based upon polymer weight. The foams were made with various carbon black loadings and at various foaming temperatures.

The R value for foams was measured at various pressures by the method set forth in Example 1.

Microcellular foams of small average cell size, high open cell content, and high R value were produced.

Example 4

Foams of the present invention were prepared with the second extrusion system except as indicated below and in Table 4.

Microcellular foams of small average cell size and high open cell content were produced.

Due to the addition of carbon black, the cross-section of Run 42 could be made larger than that of Run 41. The carbon black increased gel viscosity, and allowed the die opening to be enlarged without losing die pressure and causing prefoaming. The increase in die opening resulted in a foam of larger cross-section being produced. The larger cross-section affords improved skin quality and greater process versatility.

Example 5

Foams of the present invention were prepared with the second extrusion system except as indicated below and in Table 5.

The foams were prepared with various blowing agents and mixtures thereof as specified in Table 5. The blowing agent loadings were pph based upon polymer weight. The foams were made with various carbon black loadings and at various foaming temperatures.

The R value for foams was measured at various pressures by the method set forth in Example 1.

Microcellular foams of small average cell size, high open cell content, and high R value were produced.

Example 6

A fabricable foam of the present invention was impressed with the surfaces of several door keys and coins. The foam was examined for the quality of impressions therein.

The foam was made with the second extrusion system of Example 1 with 7.1 pph HFC-134a, 1.0 pph carbon dioxide, 7 pph natural graphite No. FP248 (Graphite Sales, Inc.). The polymer was a polystyrene of 135,000 weight average molecular weight according to SEC. The cell size was 3.0 micron, the density was 2.7 pounds per cubic foot (pcf), and the open cell content was 100 percent.

The surface features of the keys and the coins, including letters and numerals, were readily discernible in the surface of the foam upon the removal of same. The impressions were permanently set in the foam.

Example 7

A fabricable foam of the present invention was fabricated by simple compression against an existing molding trim. The compressed foam resembled baseboard trim useful for molding around doors, floors, or ceilings. The foam retained substantial deformation without substantial collapse or recovery. Prior to compression, the foam had a density of 2.7 pcf (43 kg/m$^3$), a cell size of 30 micrometers, and an open cell content of greater than 99 percent.

TABLE 1

Foams Prepared in Example 1

| Run Number | Ext. Rate lb/hr (kg/hr) | Carbon Black (pph) | Foaming Temp. (°C.) | Foam Density pcf(kg/m$^3$) | Cell Size (mm) | Open Cell (percent) | R/inch 1 torr | R/inch 760 torr |
|---|---|---|---|---|---|---|---|---|
| 1 | 10(4.5) | 10.0 | 155 | 1.82(29.12) | 0.04 | 99 | 7.41 | — |
| 2 | 10(4.5) | 15.0 | 145 | 1.94(31.04) | 0.02 | 99 | 13.7 | — |
| 3 | 220(100) | 0.0 | 133 | 2.75(44  ) | 0.02 | 94.6 | 9.09 | 3.92 |
| 4 | 220(100) | 7.0 | 132 | 3.31(52.96) | 0.011 | 92.7 | 15.38 | 4.37 |
| 5 | 220(100) | 10.0 | 132 | 4.15(66.4) | 0.006 | 95.7 | 16.13 | 4.52 |
| 6 | 220(100) | 15.0 | 132 | 4.08(65.28) | 0.01 | 94.3 | 17.86 | 4.55 |

TABLE 2

Foams Prepared in Example 2

| Run Number | Blowing Agent | Carbon Black (pph) | Foaming Temp. (°C.) | Foam Density pcf(kg/m$^3$) | Cell Size (mm) | Open Cell (percent) | R/inch 1 torr | R/inch 760 torr |
|---|---|---|---|---|---|---|---|---|
| 7 | 9.0 HFC-134a/3.0 EtCl | 0.0 | 131 | 2.49(39.84) | 0.043 | 99.7 | — | — |
| 8 | 8.0 HFC-134a/1.0 EtCl/ 0.6 CO$_2$ | 0.0 | 131 | 3.07(49.12) | 0.024 | 99.5 | — | — |
| 9 | 4.0 CO$_2$/0.5 EtOH | 10.0 | 131 | 2.53(40.48) | 0.068 | 88.4 | — | — |
| 10 | 4.0 HFC-152a/1.0 EtCl/ 1.5 CO$_2$ | 10.0 | 131 | 2.51(40.16) | 0.049 | 84.1 | — | — |

TABLE 2-continued

Foams Prepared in Example 2

| Run Number | Blowing Agent | Carbon Black (pph) | Foaming Temp. (°C.) | Foam Density pcf(kg/m³) | Cell Size (mm) | Open Cell (percent) | R/inch 1 torr | R/inch 760 torr |
|---|---|---|---|---|---|---|---|---|
| 11 | 8.0 HFC-152a/0.6 CO₂ | 10.0 | 133 | 2.31(36.96) | 0.049 | 97.1 | — | — |
| 12 | 5.0 HFC-152a/3.5 HFC-134a | 10.0 | 133 | 2.32(37.12) | 0.038 | 95.5 | — | — |
| 13 | 6.8 HFC-134a/1.9 HFC-152a/.27 Argon | 10.0 | 131 | 4.39(70.24) | 0.005 | 94.3 | 16.39 | — |
| 14 | 6.8 HFC-134a/2.4 HFC-152a/.19 N₂ | 10.0 | 131 | 2.87(45.92) | 0.005 | 95.4 | 12.21 | — |
| 15 | 6.8 HFC-134a/2.4 HFC-152a/ | 10.0 | 131 | 5.13(82.08) | 0.005 | 93.3 | 14.29 | — |
| 16 | 6.8 HFC-134a/2.4 HFC-152a/.34 Celogen AZ130[1] | 10.0 | 131 | 3.51(56.16) | 0.007 | 95.4 | 15.38 | — |
| 17 | 6.8 HFC-134a/1.9 HFC-152a/0.6 CO₂ | 7.0 | 132 | 3.31(52.96) | 0.011 | 92.7 | 15.38 | — |
| 18 | 10.6 HFC-134a | 6.9 | 127 | 3.48(55.68) | 0.025 | 98.0 | — | — |
| 19 | 8.5 HFC-134a/0.9 HCFC-142a | 6.9 | 125 | 4.35(69.6) | 0.008 | 98.0 | — | — |
| 20 | 7.0 HFC-143a/0.9 HCFC-142b | 6.9 | 126 | 4.08(65.28) | 0.007 | — | — | — |
| 21 | 5.5 HFC-143a/2.4 HCFC-22 | 6.9 | 123 | 4.28(68.48) | 0.012 | 96.0 | 13.51 | 4.31 |
| 22 | 8.0 HFC-22 | 6.9 | 130 | 3.15(50.4) | 0.065 | 97.0 | — | — |
| 23 | 8.4 HFC-134a/0.8 HCFC-22 | 10.0 | 126 | 3.89(62.24) | 0.009 | 97.0 | 13.51 | 4.46 |

[1]Celogen AZ130 is a chemical blowing agent of Uniroyal Corp.

TABLE 3

Foams Prepared in Example 3

| Run Number | Blowing Agent | Carbon Black (pph) | Foaming Temp. (°C.) | Cell Size (mm) | Open Cell (percent) | R/inch | Vacuum Pressure (torr) |
|---|---|---|---|---|---|---|---|
| 24 | 8.0 HFC-134a/2.0 EtCl | 0.0 | 131 | 0.041 | 95.5 | 12.5 | 0.0 |
| 25 | 8.0 HFC-134a/2.0 EtCl | 0.0 | 131 | 0.041 | 95.5 | 8.62 | 1.0 |
| 26 | 8.0 HFC-134a/2.0 EtCl | 0.0 | 131 | 0.041 | 95.5 | 6.58 | 5.0 |
| 27 | 8.0 HFC-134a/2.0 EtCl | 0.0 | 131 | 0.041 | 95.5 | 5.71 | 10.0 |
| 28 | 8.0 HFC-134a/2.0 EtCl | 10 | 129 | 0.048 | 96 | 18.18 | 0.0 |
| 29 | 8.0 HFC-134a/2.0 EtCl | 10 | 129 | 0.048 | 96 | 11.49 | 1.0 |
| 30 | 8.0 HFC-134a/2.0 EtCl | 10 | 129 | 0.048 | 96 | 7.25 | 5.0 |
| 31 | 8.0 HFC-134a/2.0 EtCl | 10 | 129 | 0.048 | 96 | 6.02 | 10.0 |
| 32 | 8.6 HFC-134a/2.4 HFC-152a | 10 | 123 | 0.005 | 98 | 18.0 | 0.0 |
| 33 | 8.6 HFC-134a/2.4 HFC-152a | 10 | 123 | 0.005 | 98 | 12.4 | 1.0 |
| 34 | 8.6 HFC-134a/2.4 HFC-152a | 10 | 123 | 0.005 | 98 | 9.5 | 5.0 |
| 35 | 8.6 HFC-134a/2.4 HFC-152a | 10 | 123 | 0.005 | 98 | 7.0 | 10.0 |
| 36 | 7.5 HFC-134a/2.0 HFC-152a | 6.9 | 127 | 0.006 | 97 | 20.8 | 0.0 |
| 37 | 7.5 HFC-134a/2.0 HFC-152a | 6.9 | 127 | 0.006 | 97 | 18.87 | 1.0 |
| 38 | 7.5 HFC-134a/2.0 HFC-152a | 6.9 | 127 | 0.006 | 97 | 9.26 | 5.0 |
| 39 | 7.5 HFC-134a/2.0 HFC-152a | 6.9 | 127 | 0.006 | 97 | 5.09 | 10.0 |

TABLE 4

Foams Prepared in Example 4

| Run Number | Blowing Agent | Carbon Black (pph) | Foaming Temp. (°C.) | Foam Density pcf (kg/m³) | Cell Size (mm) | Open Cell (percent) | Board Dimen. inch × inch (cm × cm) Ver. × Hor.[1] |
|---|---|---|---|---|---|---|---|
| 40 | 8.0 HFC-134a/1.0 EtCl/0.6 CO₂ | 0.0 | 131 | 3.07(49.12) | 0.030 | 99.5 | ⅜ × 2½ (0.95 × 6.35) |
| 41 | 8.0 HFC-134a/1.0 EtCl/0.6 CO₂ | 10.0 | 131 | 2.60(41.6) | 0.040 | 98.6 | ⅝ × 3½ (1.59 × 8.89) |

[1]Ver. × Hor.-vertical direction and horizontal direction in cross-section

TABLE 5

Foams Prepared in Example 5

| Run Number | Blowing Agent | Carbon Black (pph) | Foaming Temp. (°C.) | Foam Density pcf(kg/m³) | Cell Size (mm) | Open Cell (percent) | R/inch 1 torr | R/inch (R/cm) 760 torr |
|---|---|---|---|---|---|---|---|---|
| 42 | 7.1 HFC-134a | 10 pph syn graph[1] | 130 | 3.82(61.12) | 0.009 | 100 | 20.6 | — |
| 43 | 7.1 HFC-134a | 5 pph syn graph 5 pph ther black[2] | 130 | 3.68(58.88) | 0.008 | 99 | 20.0 | — |
| 44 | 7.1 HFC-134a | 10 pph nat graph[3] | 131 | 3.66 58.56) | 0.007 | 95 | 18.3 | — |
| 45 | 12.2 HFC-134a | 10 pph furn black[4] | 130 | 2.96(47.36) | 0.008 | 98 | 17.2 | — |

[1] syn graph-synthetic graphite LS2849 of Graphite Products.
[2] ther black-thermal black FT239 of Huber Corp.
[3] nat graph-natural graphite GP601 of Graphite Products.
[4] furn black-furnace black Monarch 1400 of Cabot Corp.

While embodiments of the microcellular foam and the process for making of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making an extruded, open-cell microcellular alkenyl aromatic polymer foam having an open cell content of about 70 percent or more and having an average cell size of about 70 micrometers or less and a density of about 16 to 100 kilograms per cubic meter, comprising:
   a) heating an alkenyl aromatic polymer material comprising greater than 50 weight percent alkenyl aromatic monomeric units;
   b) incorporating into the melt polymer material a nucleating agent additive at from about 0.01 to about 5 parts by weight based upon the weight of the polymer material;
   c) incorporating into the melt polymer material at an elevated pressure to form a foamable gel a blowing agent of which about 50 mole percent or more is selected from the group consisting of 1,1-difluoroethane, 1,1,1-trifluoroethane, 1,1,1,2-tetrafluoro-ethane, chlorodifluoromethane, carbon dioxide, and mixtures of any of the foregoing based upon the total number of moles of blowing agent, the blowing agent being present at about 0.06 to 0.17 gram-moles per kilogram of polymer material;
   d) cooling the foamable gel to a foaming temperature sufficient to form a form having 70 percent or more open cell content; and
   e) extruding the foamable gel through a die into a region of lower pressure to form the form.

2. The process of claim 1, wherein the nucleating agent additive is incorporated into the melt polymer material at from 0.1 to about 3 parts by weight based on the weight of the polymer material.

3. The process of claim 1, wherein the blowing agent incorporated into the melt polymer material of which 70 mole percent or more is selected from the group consisting of 1,1-difluoroethane, 1,1,1-trifluoroethane, 1,1,1,2-tetrafluoro-ethane, chlorodifluoromethane, carbon dioxide, and mixtures of any of the foregoing based upon the total number of moles of blowing agent.

4. The process of claim 1, wherein the blowing agent is incorporated into the melt polymer material at about 0.08 to about 0.12 gram-moles per kilogram of polymer material.

5. The process of claim 1, wherein the foamable gel is adjusted to a foaming temperature of about 118° C. to about 160° C.

6. The process of claim 1, wherein the foamable gel is adjusted to a foaming temperature of about 125° C. to about 135° C.

7. The process of claim 1, wherein the foamable gel is adjusted to a foaming temperature sufficient to form a foam having about 90 percent or more open cell.

8. The process of claim 1, wherein the foamable gel is adjusted to a foaming temperature sufficient to form a foam having about 95 percent or more open cell.

9. The process of claim 1, wherein the foam has an average cell size of 15 micrometers to 70 micrometers.

10. The process of claim 1, wherein the foam has an average cell size of 5 micrometers to about 30 micrometers.

11. The process of claim 1, wherein the foam has an average cell size of 5 micrometers to 11 micrometers.

12. The process of claim 1, wherein the foam has a density of about 25 to 100 kilograms per cubic meter.

13. The process of claim 1, wherein the blowing agent is 1,1-difluoroethane.

14. The process of claim 1, wherein the blowing agent is 1,1,1-trifluoroethane.

15. The process of claim 1, wherein the blowing agent is 1,1,1,2-tetrafluoroethane.

16. The process of claim 1, wherein the blowing agent is chlorodifluoromethane.

17. The process of claim 1, wherein the blowing agent is carbon dioxide.

18. The process of claim 1, wherein the blowing agent is 70 mole percent or more selected from the group consisting of 1,1-difluoroethane, 1,1,1-trifluoroethane, 1,1,1,2-tetrafluoro-ethane, chlorodifluoromethane, carbon dioxide, and mixtures of any of the foregoing based upon the total number of moles of blowing agent; the foamable gel is adjusted to foaming temperature of about 118° C. to about 160° C.; the foamable gel is adjusted to a foaming temperature sufficient to form a foam having about 90 percent or more open cell; and the foam has an average cell size of 5 micrometers to 70 micrometers.

19. The process of claim 18, wherein the blowing agent is 1,1-difluoroethane.

20. The process of claim 18, wherein the blowing agent is 1,1,1-trifluoroethane.

21. The process of claim 18, wherein the blowing agent is 1,1,1,2-tetrafluoroethane.

22. The process of claim 18, wherein the blowing agent is chlorodifluoromethane.

23. The process of claim 18, wherein the blowing agent is carbon dioxide.

24. The process of claim 18, wherein the nucleating agent additive is incorporated into the melt polymer material at from 0.1 to about 3 parts by weight based on the weight of the polymer material; the blowing agent being incorporated into the melt polymer material at about 0.08 to about 0.12 gram-moles per kilogram of polymer material; the foamable gel being adjusted to a foaming temperature of about 125° C. to about 135° C.; the foamable gel being adjusted to a foaming temperature sufficient to form a foam having about 95 percent or more open cell; the foam having an average cell size of 5 micrometers to 30 micrometers; and the foam having a density of about 25 to 100 kilograms per cubic meter.

25. The process of claim 1, wherein the polymer material comprises polystyrene.

26. The process of claim 18, wherein the polymer material comprises polystyrene.

* * * * *

UNITED STATES PATENT AND TRADEMARK OFFICE
CERTIFICATE OF CORRECTION

PATENT NO. : 5,780,521
DATED : July 14, 1998
INVENTOR(S) : Shmidt, et al.

It is certified that error appears in the above-identified patent and that said Letters Patent is hereby corrected as shown below:

Claim 9, column 14, line 31, "size of 15" should correctly read --size of 5--.

Claim 10, column 14, line 33, following "to" delete "about".

Signed and Sealed this

Seventeenth Day of August, 1999

Attest:

Q. TODD DICKINSON

Attesting Officer      Acting Commissioner of Patents and Trademarks